US011003436B2

(12) United States Patent
Ali et al.

(10) Patent No.: US 11,003,436 B2
(45) Date of Patent: May 11, 2021

(54) COMPOSABLE INFRASTRUCTURE UPDATE SYSTEM

(71) Applicant: Dell Products L.P., Round Rock, TX (US)

(72) Inventors: Rizwan Ali, Cedar Park, TX (US); Ravikanth Chaganti, Karnataka (IN); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/653,700

(22) Filed: Oct. 15, 2019

(65) Prior Publication Data

US 2021/0109736 A1 Apr. 15, 2021

(51) Int. Cl.
*G06F 9/44* (2018.01)
*G06F 8/65* (2018.01)
*G06F 9/50* (2006.01)
*G06F 9/46* (2006.01)

(52) U.S. Cl.
CPC .......... *G06F 8/65* (2013.01); *G06F 9/46* (2013.01); *G06F 9/505* (2013.01); *G06F 9/5011* (2013.01)

(58) Field of Classification Search
None
See application file for complete search history.

(56) References Cited

U.S. PATENT DOCUMENTS

| | | | |
|---|---|---|---|
| 7,913,246 B2 | 3/2011 | Hammond et al. | |
| 10,255,064 B2 | 4/2019 | Li et al. | |
| 2008/0281958 A1* | 11/2008 | McKinnon | G06F 9/5027 709/224 |
| 2012/0030666 A1* | 2/2012 | Laicher | G06F 8/65 717/173 |
| 2016/0285966 A1* | 9/2016 | Brech | G06F 3/126 |
| 2017/0104788 A1* | 4/2017 | Cudak | G06F 8/65 |
| 2019/0340166 A1* | 11/2019 | Raman | H04L 67/1034 |
| 2019/0340167 A1* | 11/2019 | Raman | G06F 11/2007 |
| 2020/0026579 A1* | 1/2020 | Bahramshahry | G06F 3/067 |
| 2020/0151024 A1* | 5/2020 | Ji | G06F 9/546 |
| 2020/0249928 A1* | 8/2020 | Zeng | G06F 9/45558 |
| 2020/0293421 A1* | 9/2020 | Hamdi | G06F 21/52 |
| 2020/0334068 A1* | 10/2020 | Krishnamurthy | G06F 11/3466 |
| 2020/0348984 A1* | 11/2020 | Giannetti | G06F 8/60 |

* cited by examiner

*Primary Examiner* — Insun Kang
(74) *Attorney, Agent, or Firm* — Haynes and Boone, LLP

(57) ABSTRACT

A composable infrastructure update system includes a composable infrastructure management system coupled to a composable infrastructure system including composable infrastructure components. The composable infrastructure management system identifies workload solutions that are being provided by at least one of the composable infrastructure components and, for each workload solution, generates a respective workload solution catalog that identifies the at least one of the composable infrastructure components that are providing that workload solution. The composable infrastructure management system then receive a software update for a first composable infrastructure component, determines that the first composable infrastructure component is being used to provide at least two of the workload solutions, and schedules the performance of the software update for the first composable component in consideration of the at least two of the workload solutions.

20 Claims, 14 Drawing Sheets

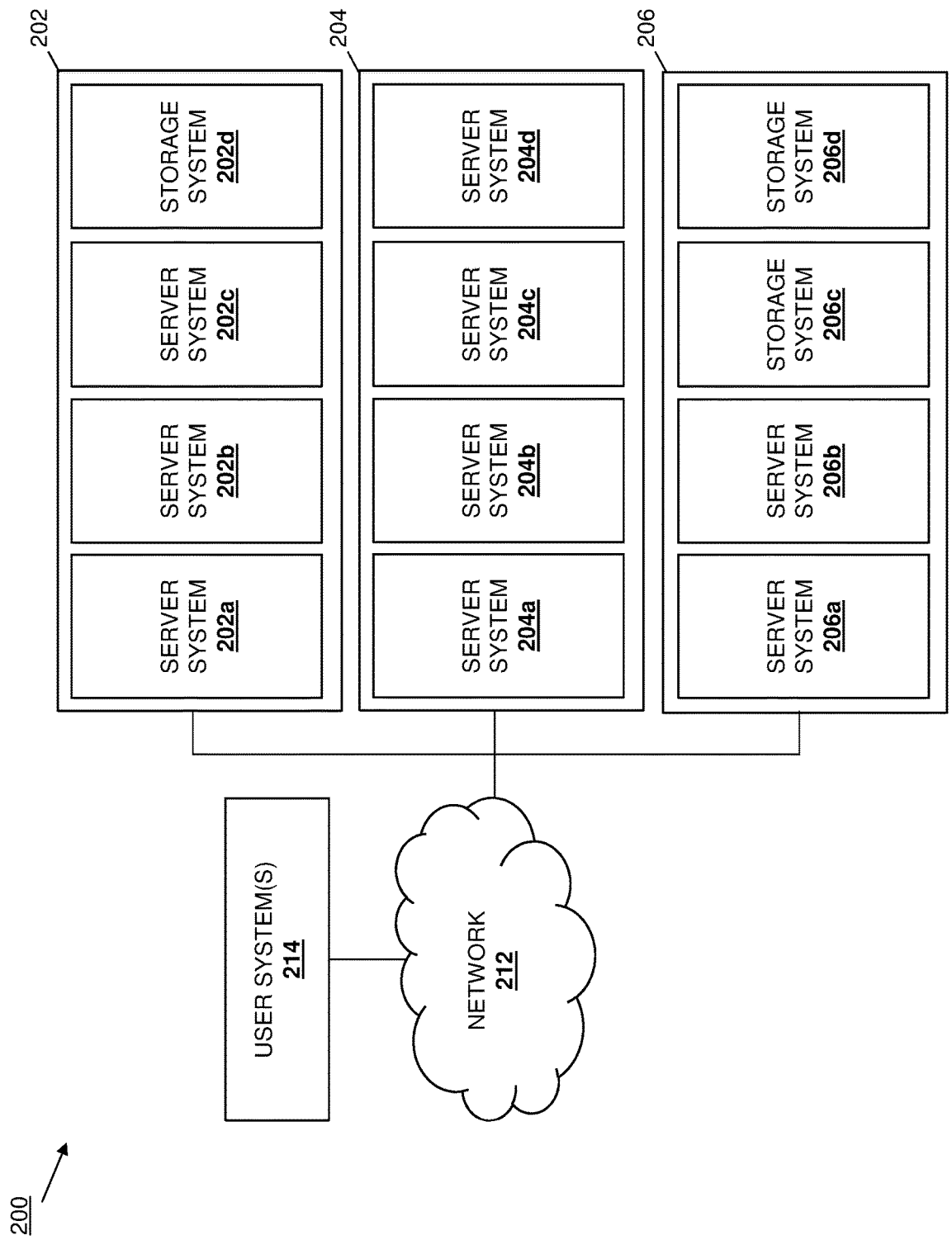

COMPOSABLE INFRASTRUCTURE UPDATE SYSTEM

BACKGROUND

The present disclosure relates generally to information handling systems, and more particularly to providing updates to a composable infrastructure information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may sometimes be provided as composable infrastructure systems that treat compute, storage, and networking devices as pools of resources that may be provisioned as needed depending on the needs of different workloads. As such, composable infrastructure systems may provide solutions for workloads ("workload solutions") from relatively large pools of compute, storage, and networking resources, which may enable multiple entities (e.g., system administrators) to compose and build workload solutions from the same pool of resources. Such workload solutions provided via composable infrastructure systems may be logically discrete and, as such, the workloads associated with them independent from each other. However, conventional converged infrastructure systems are configured to update their pool of resources as integrated unit(s) without the consideration of the workload solutions they provide, which can raise some issues. For example, a converged infrastructure system may include multiple chassis, with each chassis including combinations of server systems and/or storage systems, and conventional converged infrastructure system updates are often applied to all of the server systems and/or storage systems in any particular chassis. However, as discussed above, any particular chassis may be used to provide at least a portion of multiple different and discrete workload solutions, and thus the entire-chassis update operations discussed above will result in downtime for multiple different and discrete workload solutions. As such, the lack of consideration and independent treatment of discrete workload solutions by conventional converged infrastructure systems as part of their composable system lifecycle update operations can result in unavailability issues for workload solutions.

Accordingly, it would be desirable to provide a composable infrastructure update system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a composable infrastructure management engine that is configured to: identify a plurality of workload solutions that are being provided by at least one of a plurality of composable infrastructure components included in a composable infrastructure system; generate, for each of the plurality of workload solutions, a respective workload solution catalog that identifies the at least one of the plurality of composable infrastructure components in the composable infrastructure system that are providing that workload solution; receive a first software update for a first composable infrastructure component that is included in the plurality of composable infrastructure components; determine that the first composable infrastructure component is being used to provide at least two of the plurality of workload solutions; and schedule the performance of the first software update for the first composable component in consideration of the at least two of the plurality of workload solutions.

BRIEF DESCRIPTION OF THE DRAWINGS

FIG. 2B is a schematic view illustrating an embodiment of the composable infrastructure update system of FIG. 2A.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
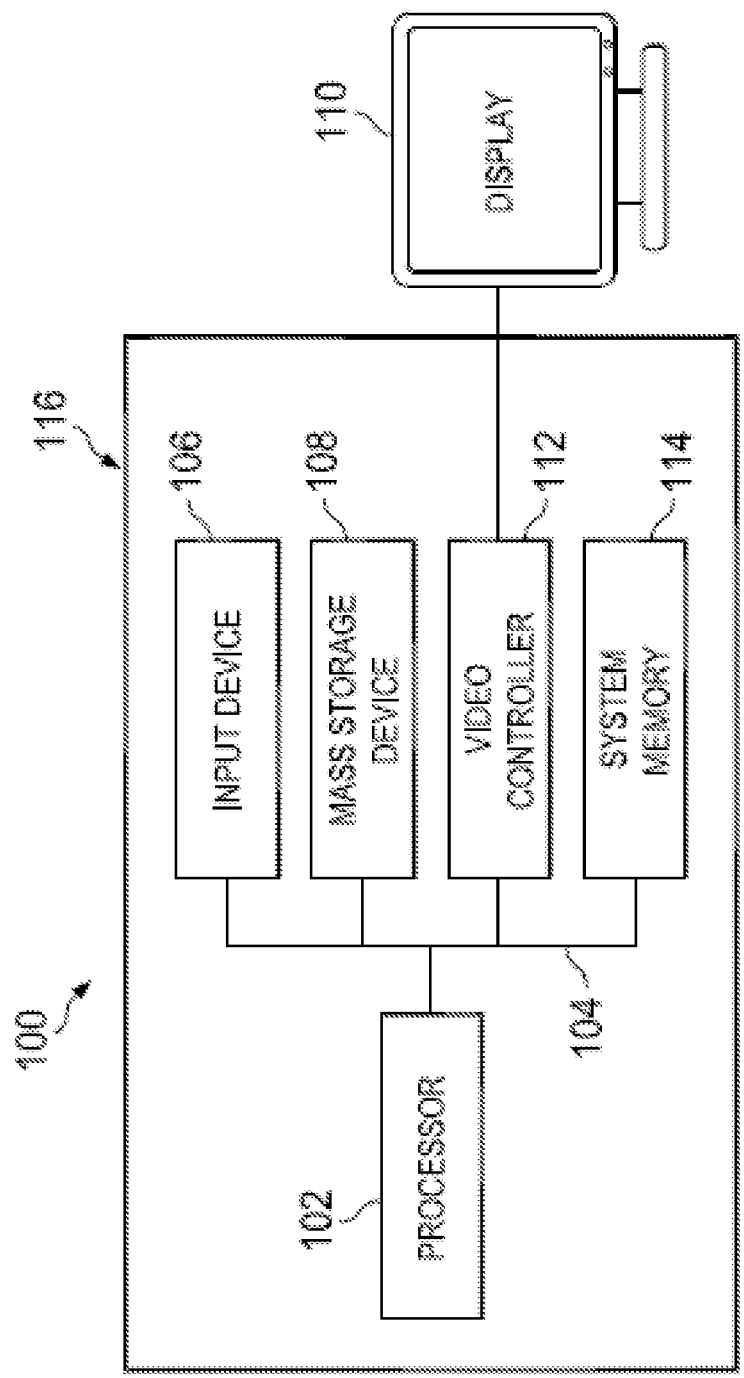
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
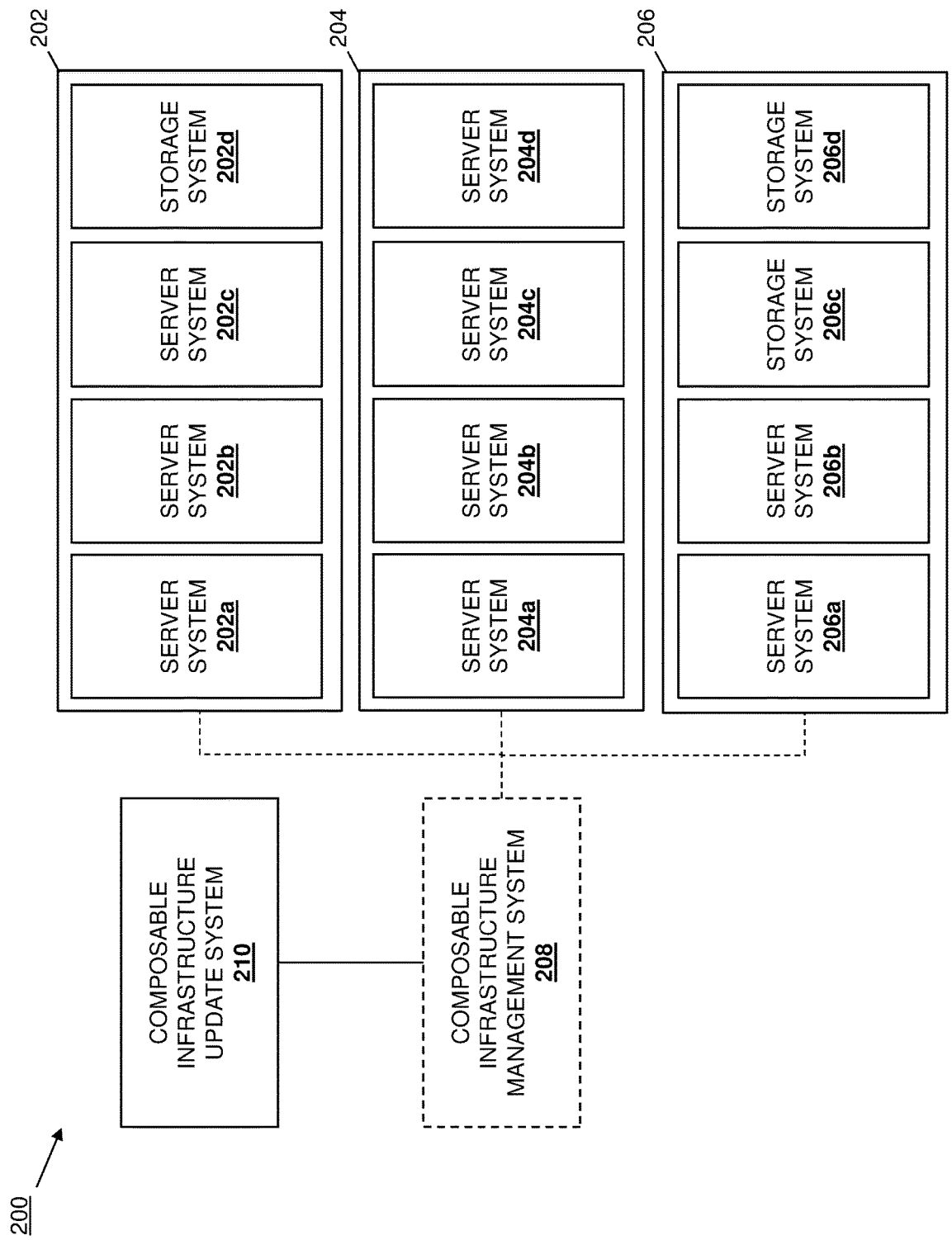
FIG. 2A is a schematic view illustrating an embodiment of a composable infrastructure update system.

Referring now to FIGS. 2A and 2B, an embodiment of a composable infrastructure update system 200 is illustrated. In the examples below, the composable infrastructure update system 200 is provided by a multi-chassis composable infrastructure system that, in the illustrated embodiment, includes a first chassis 202, a second chassis 204, and a third chassis 206, with each of those chassis 202, 204, and 206 provided by four-slot chassis. For example, the portion of the multi-chassis composable infrastructure system provided in the first chassis 202 includes composable infrastructure components provided by a server system 202a in its first slot, a server system 202b in its second slot, a server system 202c in its third slot, and a storage system 202d in its fourth; the portion of the multi-chassis composable infrastructure system provided in the second chassis 204 includes composable infrastructure components provided by a server system 204a in its first slot, a server system 204b, in its second slot a server system 204c in its third slot, and a server system 204d in its fourth slot; and the portion of the multi-chassis composable infrastructure system provided in the third chassis 206 includes composable infrastructure components provided by a server system 206a in its first slot, a server system 206b in its second slot, a storage system 206c in its third slot, and a storage system 206d in its fourth slot.

In an embodiment, any of the server systems 202a-202c, 204a-204d, 206a, and 206b may be provided by the IHS 100 discussed above with reference to FIG. 1, and/or may include some or all of the components of the IHS 100, and in the examples below are each provided by a server device housed in a server sled that is housed in the slot on that chassis. In an embodiment, any of the storage systems 202d, 206c, and 206d may be provided by the IHS 100 discussed above with reference to FIG. 1, and/or may include some or all of the components of the IHS 100, and in the examples below each include a storage device sled that is housed in the slot on that chassis and that each include a plurality of storage devices. However, while illustrated and discussed as provided by a multi-chassis composable infrastructure system with particular composable infrastructure components, one of skill in the art in possession of the present disclosure will recognize that composable infrastructure systems may be provided with a variety of composable infrastructure components and/or composable infrastructure component configurations (e.g., single chassis or different number of chassis than the three chassis in the illustrated embodiments, components other than the server systems and storage systems in the illustrated embodiments, chassis with more or fewer slots, etc.) while remaining within the scope of the present disclosure as well.

With reference to FIG. 2A, the composable infrastructure update system 200 is illustrated as including a composable infrastructure management system 208 that is coupled to each of the portions of the composable infrastructure system provided in the first chassis 202, the second chassis 204, and the third chassis 206. In the illustrated embodiment, the composable infrastructure management system 208 is illustrated in dotted lines to indicate that the composable infrastructure management system 208 may be provided by one or more subsystems in any of the first chassis 202, the second chassis 204, and the third chassis 206. For example, any or all of the first chassis 202, the second chassis 204, and the third chassis 206 may include a management subsystem (e.g., an integrated DELL® Remote Access Controller (iDRAC) available from DELL® Inc. of Round Rock, Tex., United States; a Baseboard Management Controller (BMC); a Chassis Management Controller, a Management Module, and/or other management subsystems known in the art), and the coupling and configuration of the portions of the composable infrastructure system provided in the first chassis 202, the second chassis 204, and the third chassis 206 may result in the management subsystems included in the first chassis 202, the second chassis 204, and the third chassis 206 electing a master management subsystem that will operate to provide the composable infrastructure management system 208, with the remaining management subsystems operating as passive management subsystems that are configured to take over management operations from the master management subsystem in the event it becomes unavailable. However, while a specific example of a composable infrastructure management system 208 has been described, one of skill in the art in possession of the present disclosure will recognize that other techniques for providing for the management of composable infrastructure system may be utilized in providing the composable infrastructure management system 208 while remaining within the scope of the present disclosure as well.

As illustrated, the composable infrastructure management system 208 is coupled to a composable infrastructure update system 210. In an embodiment, the composable infrastructure update system 210 may be provided by the IHS 100 discussed above with reference to FIG. 1, and/or may include some or all of the components of the IHS 100, and in specific examples may be provided by one or more server devices that are configured to operate as discussed below. With reference to FIG. 2B, the composable infrastructure update system 200 is illustrated as including a network 212 that is coupled to each of the portions of the composable infrastructure system provided in the first chassis 202, the second chassis 204, and the third chassis 206, and that may be provided by a Local Area Network (LAN), the Internet, and/or other networks that would be apparent to one of skill in the art in possession of the present disclosure. Furthermore, as illustrated, one or more user systems 214 may be coupled to the network 212 and configured to utilize the composable infrastructure system to perform workloads as discussed below. While a specific composable infrastructure update system 200 has been illustrated and described, one of skill in the art in possession of the present disclosure will recognize that the composable infrastructure update system of the present disclosure may include a variety of components and component configurations while remaining within the scope of the present disclosure as well.

Figure 3:
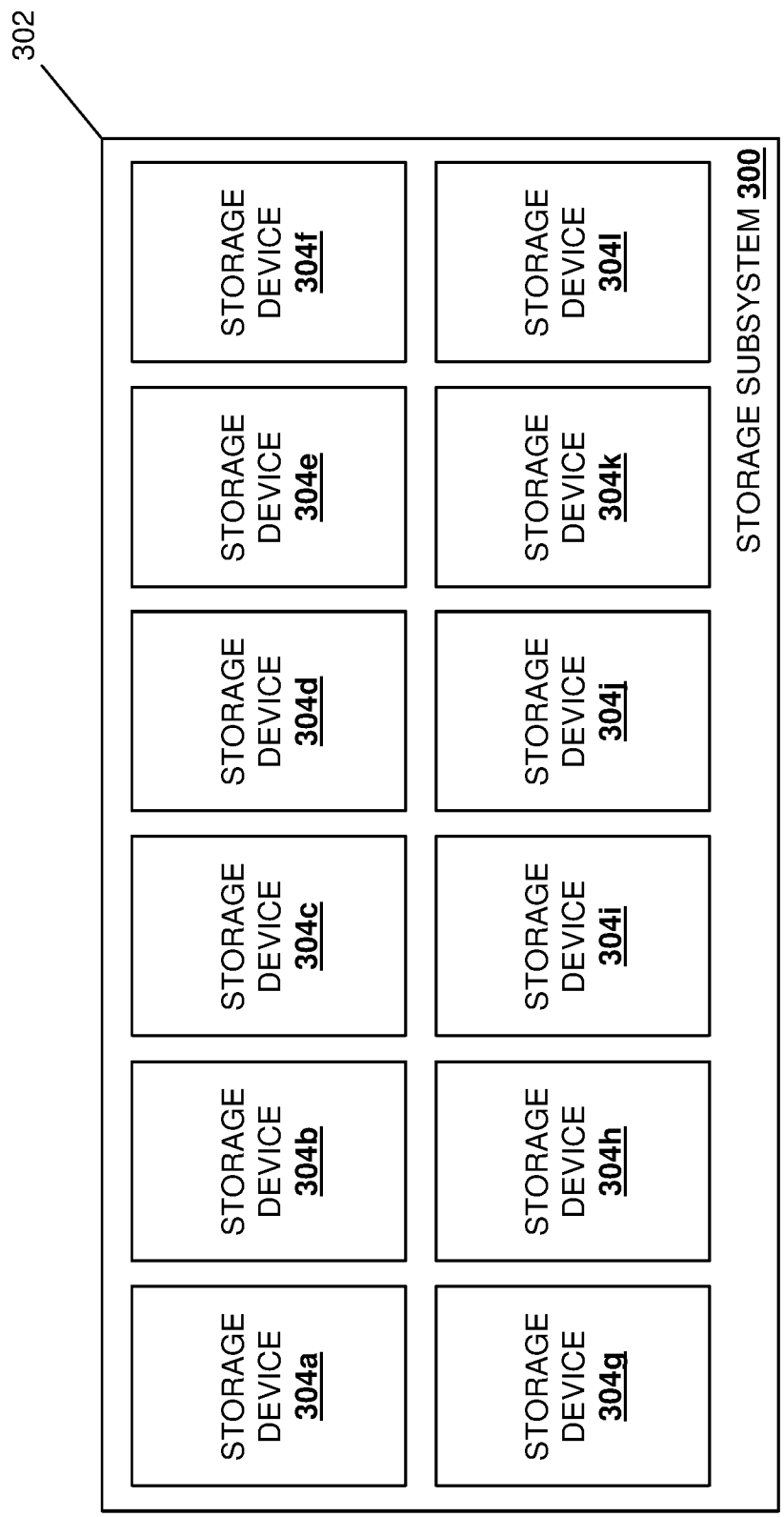
FIG. 3 is a schematic view illustrating an embodiment of a storage system that may be included in the composable infrastructure update system of FIGS. 2A and 2B.

Referring now to FIG. 3, an embodiment of a storage subsystem 300 is illustrated that may provide any (or a portion of) of the storage systems 202d, 206c, and 206d discussed above with reference to FIG. 2. As such, the storage subsystem 300 may be provided by the IHS 100 discussed above with reference to FIG. 1 and/or may include some or all of the components of the IHS 100. Furthermore, while illustrated and discussed as being provided by storage device sled including a plurality of storage devices, one of skill in the art in possession of the present disclosure will recognize that the storage subsystem 300 discussed below may be provided with other devices and/or other configurations while remaining within the scope of the present disclosure as well. In the illustrated embodiment, the storage subsystem 300 includes a chassis 302 that houses the components of the storage system 300, only some of which are illustrated below. In the examples provided herein, the chassis 302 is described as a "storage device sled" that provided by each of the storage systems 202d, 206c, and 206d discussed above with reference to FIG. 2, although other chassis will fall within the scope of the present disclosure as well. In the illustrated example, the chassis 302 houses a plurality of storage devices (e.g., Solid States Drives (SSDs), Hard Disk Drives (HDDs), etc.), including the storage devices 304a, 304b, 304c, 304d, 304e, 304f, 304g, 304h, 304i, 304j, 304k, and 304l illustrated in FIG. 3, each of which may be coupled to the composable infrastructure management system 208 discussed above with reference to FIG. 2A. While a specific storage subsystem 300 has been illustrated and described, one of skill in the art in possession of the present disclosure will recognize that storage systems of the present disclosure may include a variety of components and component configurations while remaining within the scope of the present disclosure as well.

Figure 4:
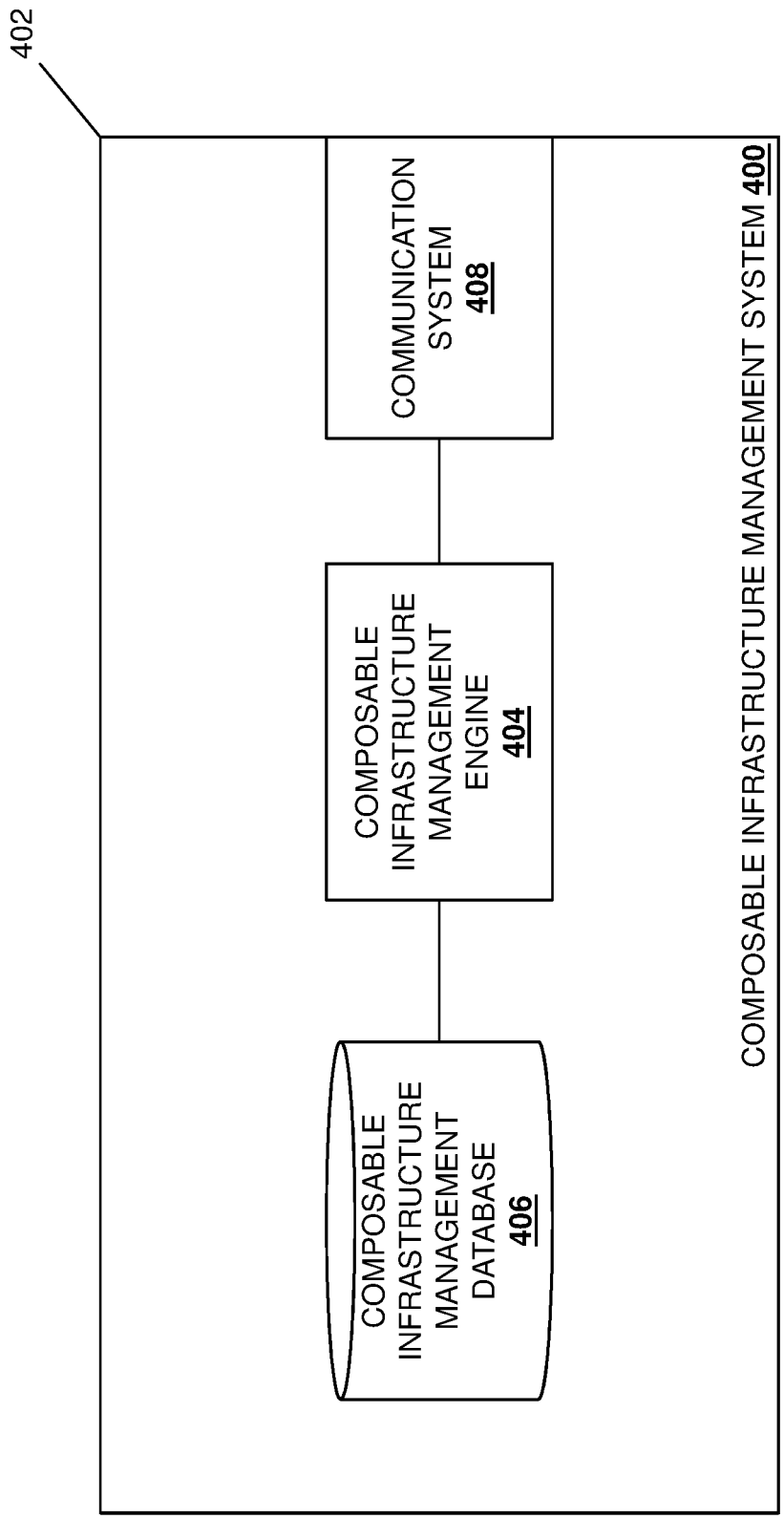
FIG. 4 is a schematic view illustrating an embodiment of a composable infrastructure management system that may be included in the composable infrastructure update system of FIGS. 2A and 2B.

Referring now to FIG. 4, an embodiment of a composable infrastructure management system 400 is illustrated that may provide the composable infrastructure management system 208 discussed above with reference to FIG. 2A. As such, the composable infrastructure management system 400 may be provided by the IHS 100 discussed above with reference to FIG. 1 and/or may include some or all of the components of the IHS 100. Furthermore, while illustrated as a stand-alone composable infrastructure management system 400, as discussed above, one of skill in the art in possession of the present disclosure will recognize that the functionality of the composable infrastructure management system 400 discussed below may be provided by management subsystem(s) in the chassis (e.g., the first chassis 202, the second chassis 204, and/or the third chassis 206 discussed above with reference to FIG. 2) used to provide the composable infrastructure system of the present disclosure. In the illustrated embodiment, the composable infrastructure management system 400 includes a management Input/Output (I/O) module 402 (which may be included in any of the chassis 202, 204, and 206 discussed above with reference to FIG. 2) that houses the components of the composable infrastructure management system 400, only some of which are illustrated below. For example, the management I/O module 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a composable infrastructure management engine 404 that is configured to perform the functionality of the composable infrastructure management engines and/or composable infrastructure management systems discussed below.

The management I/O module 402 may also house a storage system (not illustrated, but which may include the storage 108 discussed above with reference to FIG. 1) that is coupled to the composable infrastructure management engine 404 (e.g., via a coupling between the storage system and the processing system) and that includes a composable infrastructure management database 406 that is configured to store any of the information utilized by the composable infrastructure management engine 404 discussed below. The management I/O module 402 may also house a communication system 408 that is coupled to the composable infrastructure management engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific composable infrastructure management system 400 has been illustrated, one of skill in the art in possession of the present disclosure will recognize that composable infrastructure management systems (or other devices operating according to the teachings of the present disclosure in a manner similar to that described below for the composable infrastructure management system 400) may include a variety of components and/or component configurations for providing conventional management functionality, as well as the functionality discussed below, while remaining within the scope of the present disclosure as well.

Figure 5:
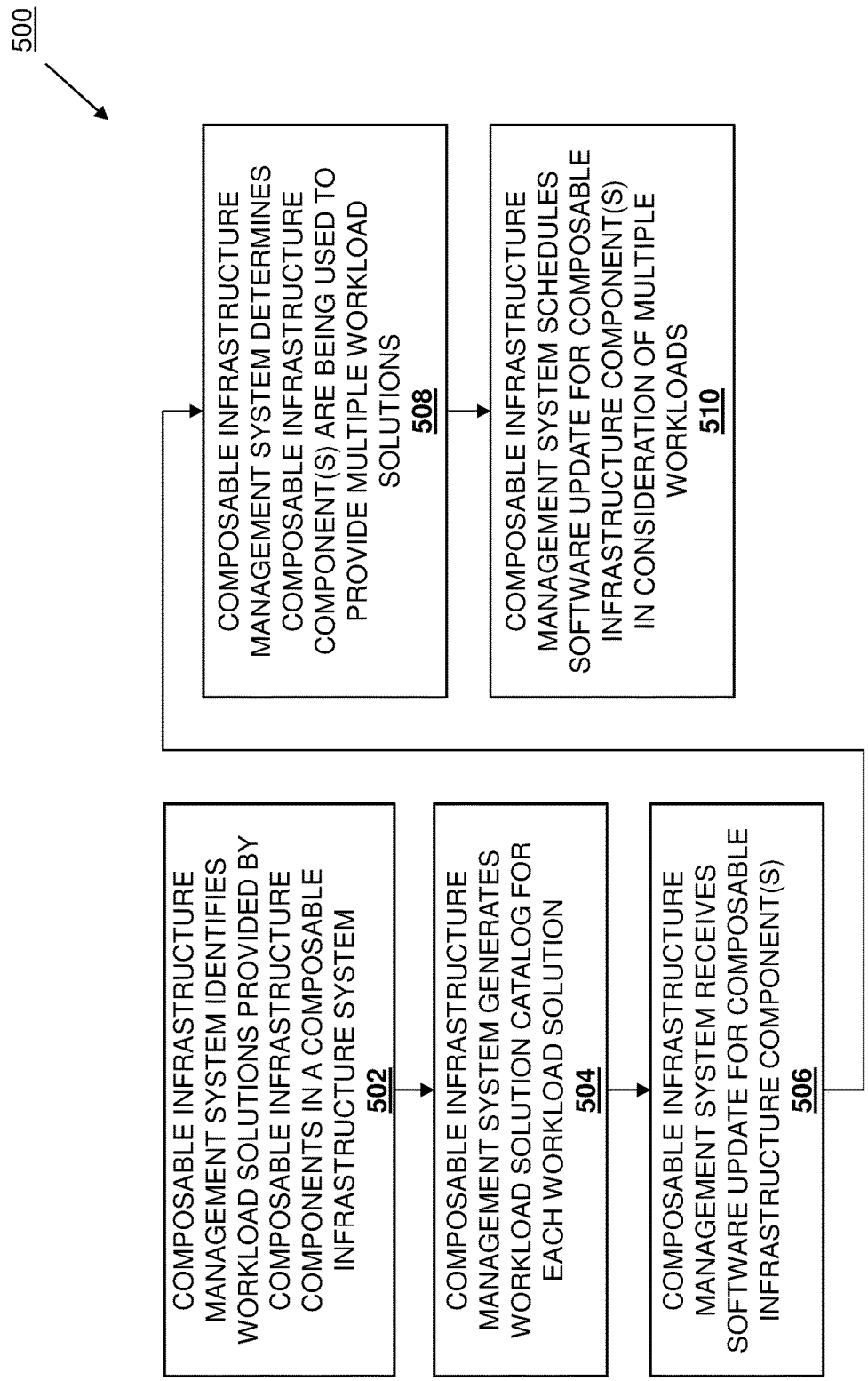
FIG. 5 is a flow chart illustrating an embodiment of a method for updating a composable infrastructure system.

Referring now to FIG. 5, an embodiment of a method 400 for updating a composable infrastructure system is illustrated. As discussed below, the systems and methods of the present disclosure provide for independent treatment of discrete workload solutions when performing updates for composable infrastructure systems that provide those workload solutions, and thus in consideration of the Service Level Agreements (SLAs), downtime requirements, cluster aware update processes, and/or other characteristics/properties of those workload solutions. For example, a composable infrastructure management system may maintain a master inventory list of all of the updateable composable infrastructure components in the composable infrastructure system, and use that master inventory list to retrieve the latest applicable software updates for those composable infrastructure components and store those software updates in a local software repository. The composable infrastructure management system may then utilize a composable infrastructure/workload solution data store to create a custom workload solution catalog for each workload solution being provided by the composable infrastructure system, which may identify all of the composable infrastructure components/hardware that are being utilized to provide any particular workload solution, along with the software (e.g., a firmware version) being utilized by those composable infrastructure components/hardware. The workload solution catalogs may then be used along with the local software repository to provide for the updating of software for any particular composable infrastructure component/hardware in a manner that considers the multiple workload solutions it may be currently providing (i.e., on a per-workload solution and per-composable-infrastructure-component basis), thus providing composable infrastructure system updates in consideration of the SLAs, downtimes, cluster aware update processes, and/or other characteristics/properties of the workload solutions it provides.

Figure 6:
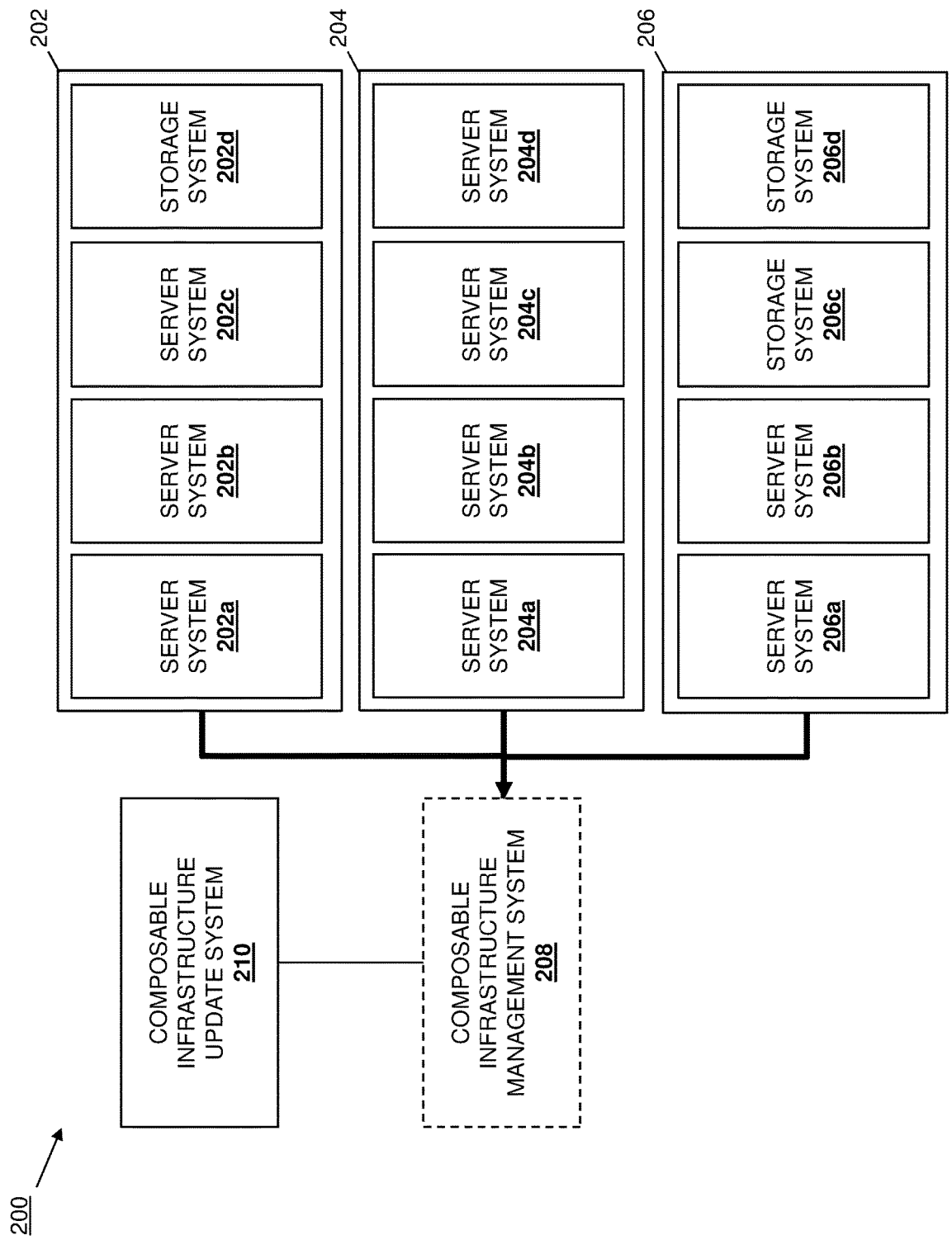
FIG. 6 is a schematic view illustrating an embodiment of the composable infrastructure update system of FIGS. 2A and 2B operating during the method of FIG. 5.

The method 500 begins at block 502 where a composable infrastructure management system identifies workload solutions provided by composable infrastructure components in a composable infrastructure system. With reference to FIG. 6, in some embodiments the composable infrastructure management engine 404 in the composable infrastructure management system 208 may include an inventory collector that is configured to retrieve identification information from the composable infrastructure system. For example, the inventory collector provided by the composable infrastructure management engine 404 in the composable infrastructure management system 208 may operate to connect to the management subsystems included in each of the first chassis 202, the second chassis 204, and the third chassis 306 in order to retrieve any of a variety of inventory information about the converged infrastructure components included in those chassis. As discussed above, the composable infrastructure management system 208 may be provided by an elected/master management subsystem in one of the first chassis 202, the second chassis 204, and the third chassis 306 and, as such, at block 502 that master management subsystem may retrieve inventory information about the converged infrastructure components included in its chassis, as well as inventory information from the passive management subsystems about the converged infrastructure components included in their respective chassis.

As such, with reference to the example provided in FIGS. 2A, 2B, and 6, the inventory collector provided by the composable infrastructure management engine 404 in the composable infrastructure management system 208 may retrieve inventory information about the server systems 202a-202c and the storage system 202d in the first chassis 202, the server systems 204a-204d in the second chassis 204, and the server systems 206a and 206b and the storage systems 206c and 206d in the third chassis 206. As discussed above, inventory information retrieved for composable infrastructure components/hardware may include an identification of that composable infrastructure component/hardware, current software (e.g., a current firmware version) being utilized by that composable infrastructure component/hardware, a version of hardware (e.g., a version of a Dual Inline Memory Module (DIMM)), processor microcode details, and/or a variety of other composable infrastructure component/hardware inventory information that would be apparent to one of skill in the art in possession of the present disclosure. In some embodiments, the inventory collector provided by the composable infrastructure management engine 404 in the composable infrastructure management system 208 may provide any inventory information retrieved at block 502 in a composable infrastructure "master" catalog that is stored in the composable infrastructure management database 406, and that may include any of a variety of details about the composable infrastructure system and/or its components provided in the first chassis 202, the second chassis 204, and the third chassis 306.

Furthermore, at block 502, the composable infrastructure management engine 404 in the composable infrastructure management system 208 may access a workload-solution-specific persona data store in the composable infrastructure update system 210 in order to identify each workload solution being provided by the composable infrastructure system via its composable infrastructure components in the first chassis 202, the second chassis 204, and the third chassis 306. As will be appreciated by one of skill in the art in possession of the present disclosure, the workload-solution-specific persona data store in the composable infrastructure update system 210 may be generated during or following the creation of workload solutions for workloads run by the user systems 214. As such, for each workload solution, workload-solution-specific information may be included in the workload-solution-specific persona data store that may identify each composable infrastructure component in the composable infrastructure system that is being utilized to provide that workload solution. Thus, at block 502, the composable infrastructure management engine 404 in the composable infrastructure management system 208 may utilize the composable infrastructure "master" catalog that identifies the composable infrastructure components in the composable infrastructure system provided in the in the first chassis 202, the second chassis 204, and the third chassis 306, and retrieve workload-solution-specific information for each workload solution that is being provided by those composable infrastructure components.

Figure 8:
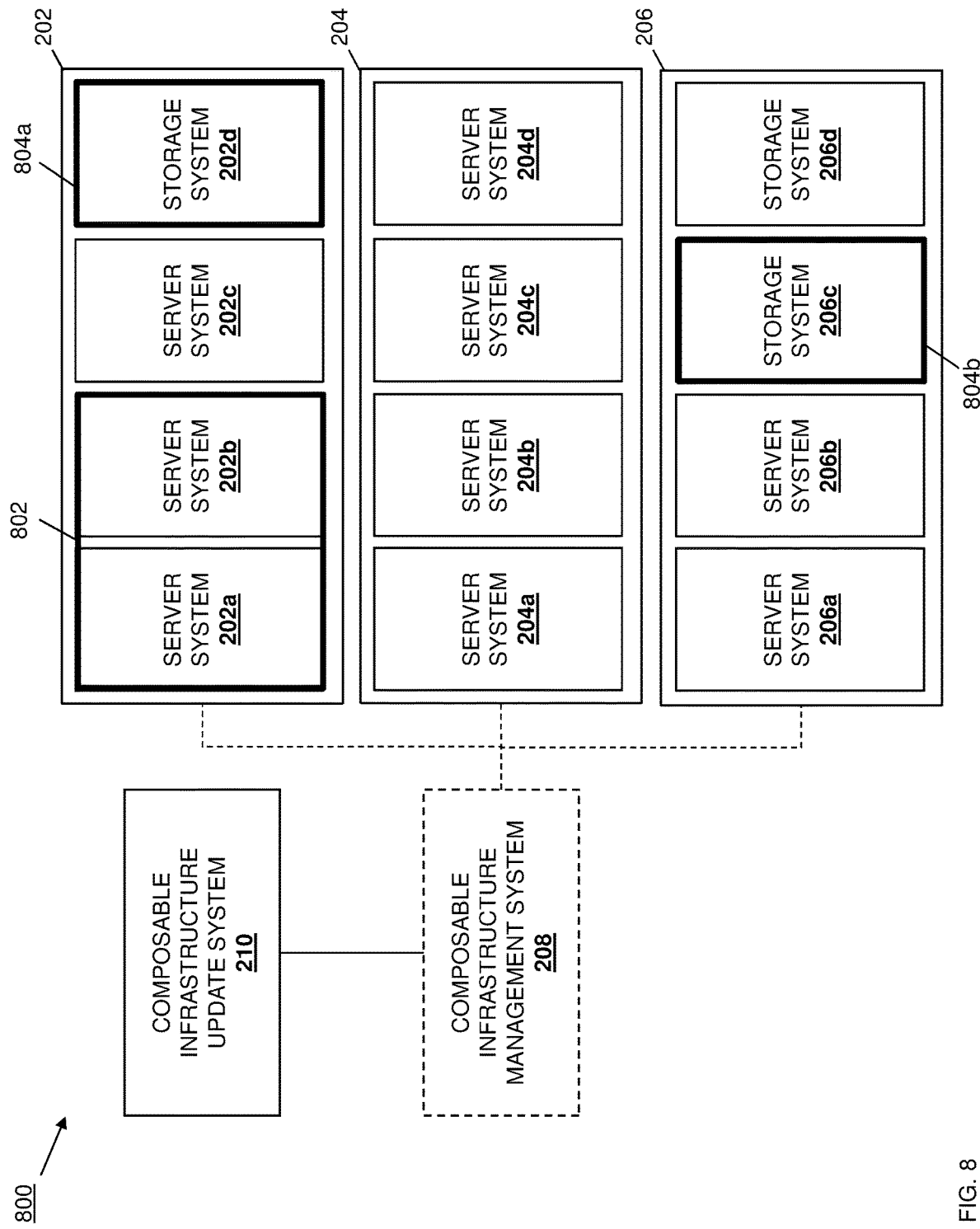
FIG. 8 is a schematic view illustrating an embodiment of the composable infrastructure update system of FIGS. 2A and 2B operating during the method of FIG. 5.

For example, with reference to FIG. 8, the workload-solution-specific information retrieved at block 502 may identify a first workload solution 800 that is provided compute resources 802 in the server systems 202a and 202b that are included in the first chassis 202, storage resources 804a in the storage system 202d that is included in the first chassis 202, and storage resources 804b in the storage system 206c that is included in the third chassis 206. Continuing with the example above, compute resources 802 for the first workload solution 800 may be provided by the server devices included in the server systems 202a and 202b, while storage resource 804a and 804b for the first workload solution 800 may be provided by storage devices in a storage device sled in the storage system 202d, and storage devices in a storage device sled in the storage system 206c. As will be appreciated by one of skill in the art in possession of the present disclosure, the server devices and storage devices utilized to provide the first workload solution 800 may include any of a variety of components that utilize software (e.g., a firmware version) to operate. Furthermore, one of skill in the art in possession of the present disclosure will also recognize that the first workload solution 800 may be provided for a first workload having a particular SLA, downtime requirements, cluster aware update processes, and/or other workload characteristics/properties known in the art.

Figure 9A:
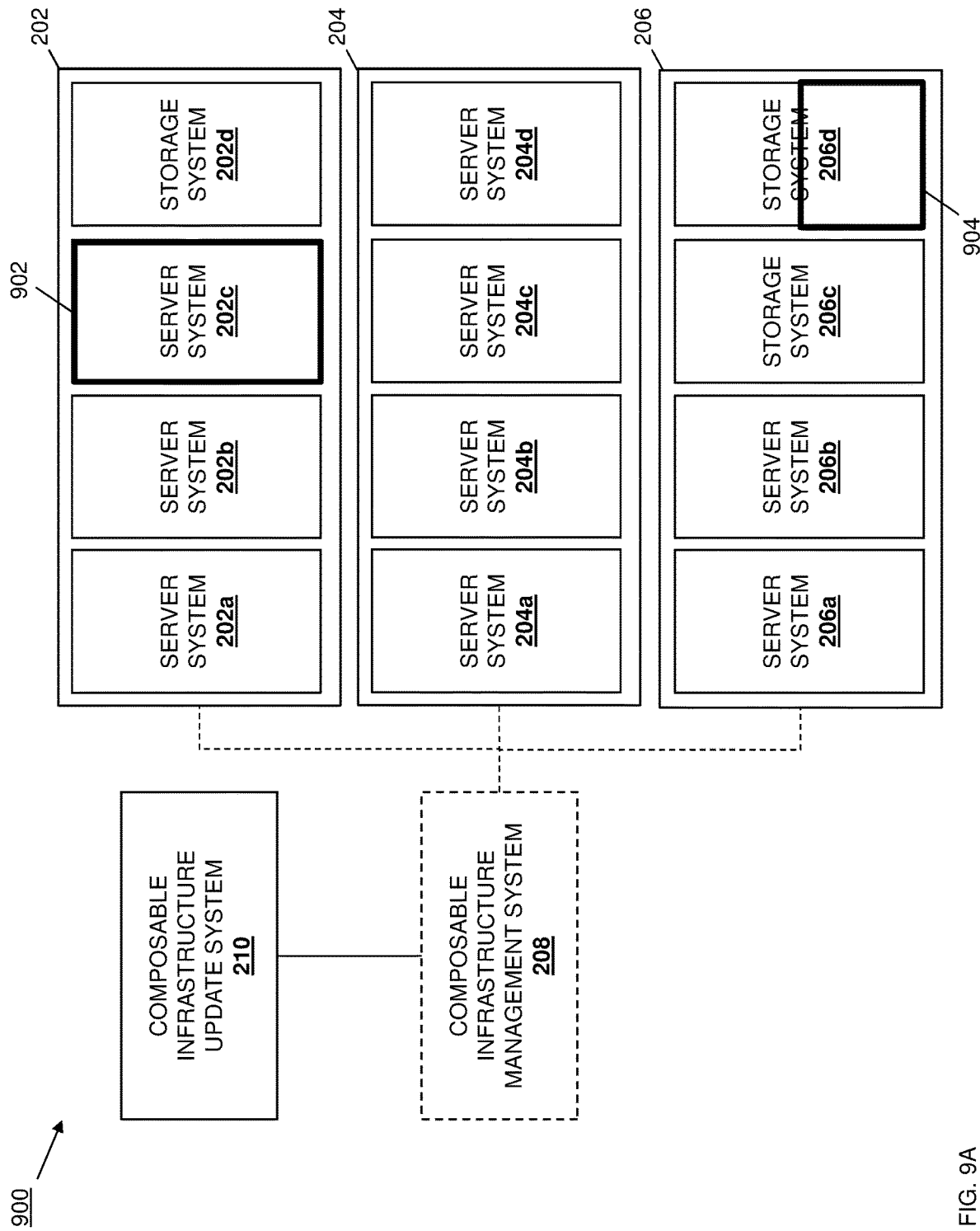
FIG. 9A is a schematic view illustrating an embodiment of the composable infrastructure update system of FIGS. 2A and 2B operating during the method of FIG. 5.
Figure 9B:
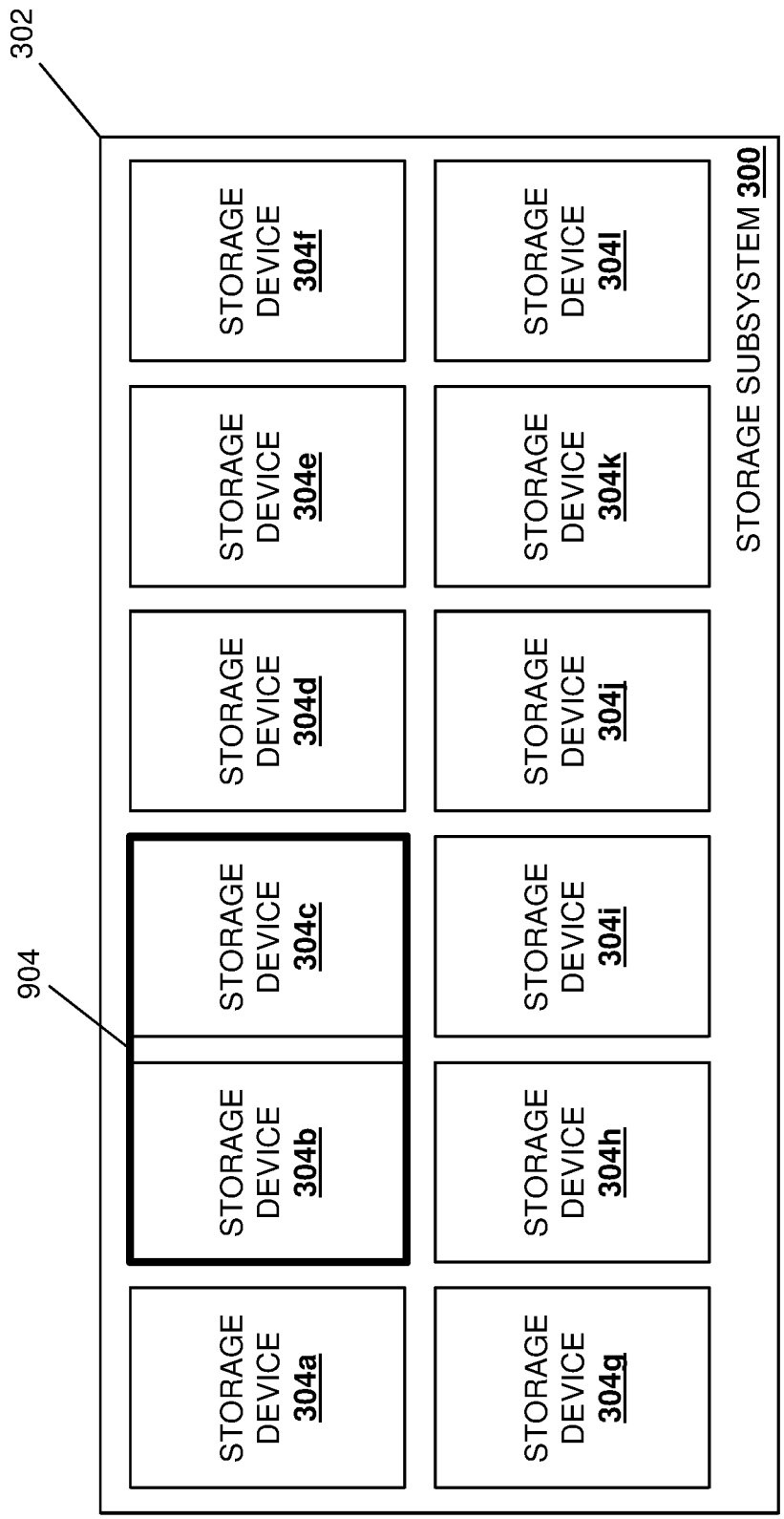
FIG. 9B is a schematic view illustrating an embodiment of the storage system of FIG. 3 operating during the method of FIG. 5.

Similarly, with reference to FIGS. 9A and 9B, the workload-solution-specific information retrieved at block 502 may identify a second workload solution 900 that is provided compute resources 902 in the server system 202c that is included in the first chassis 202, and storage resources 904 in the storage system 206d that is included in the third chassis 206. Continuing with the example above, compute resources 902 for the second workload solution 900 may be provided by the server device included in the server system 202c, while storage resources 904 for the second workload solution 900 may be provided by a first subset of storage devices in the storage device sled in the storage system 206d. For example, with reference to FIG. 9B, the storage devices 304b and 304c in the storage subsystem 300 (i.e., a first subset of the storage devices 304a-304l) included in the storage system 206d may be utilized to provide storage resources 904 for the second workload solution 900. As will be appreciated by one of skill in the art in possession of the present disclosure, the server devices and storage devices utilized to provide the second workload solution 900 may include any of a variety of components that utilize software (e.g., a firmware version) to operate. Furthermore, one of skill in the art in possession of the present disclosure will also recognize that the second workload solution 900 may be provided for a second workload having a particular SLA, downtime requirements, cluster aware update processes, and/or other workload characteristics/properties known in the art, and those workload characteristics/properties may differ from the first workload discussed above.

Figure 10A:
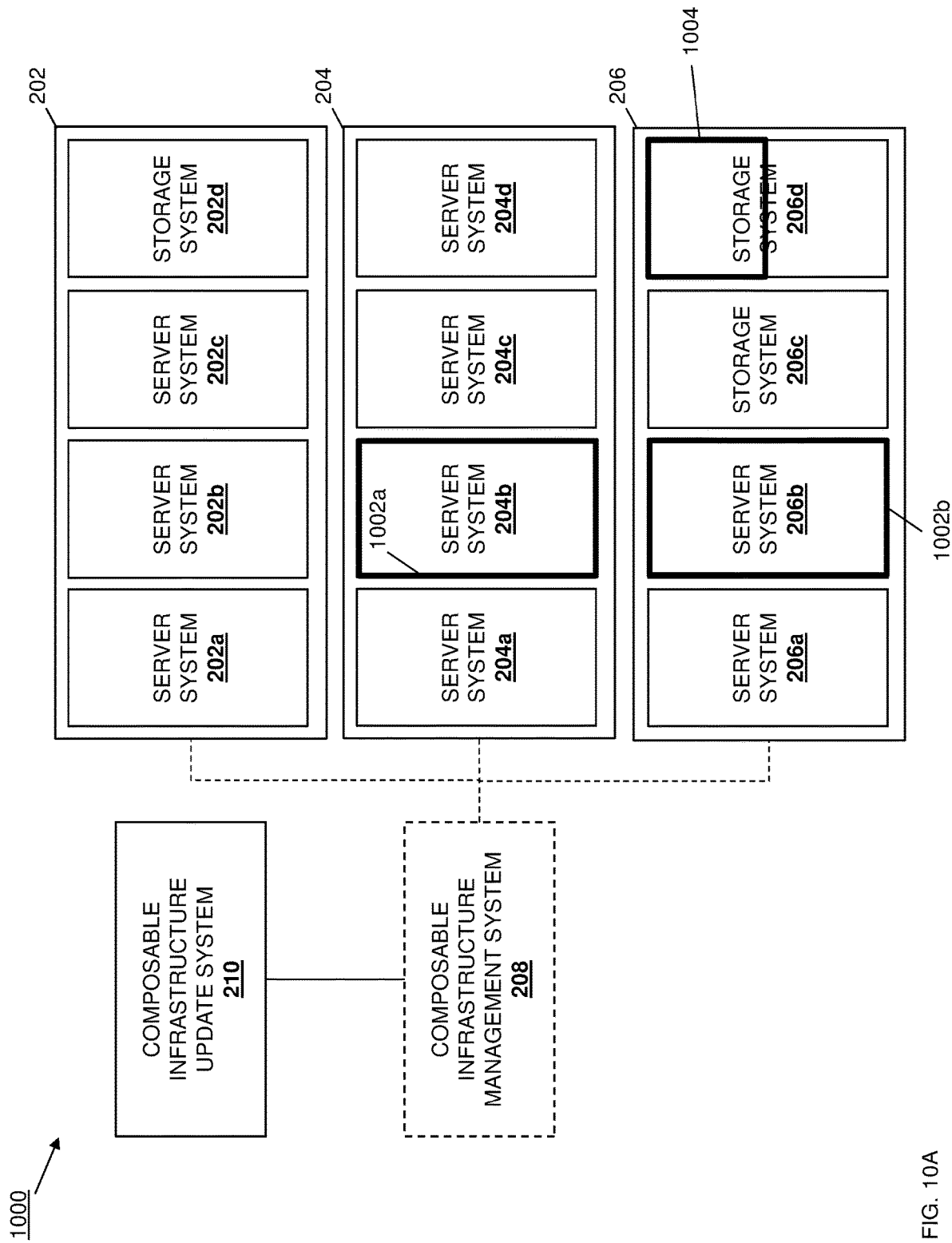
FIG. 10A is a schematic view illustrating an embodiment of the composable infrastructure update system of FIGS. 2A and 2B operating during the method of FIG. 5.
Figure 10B:
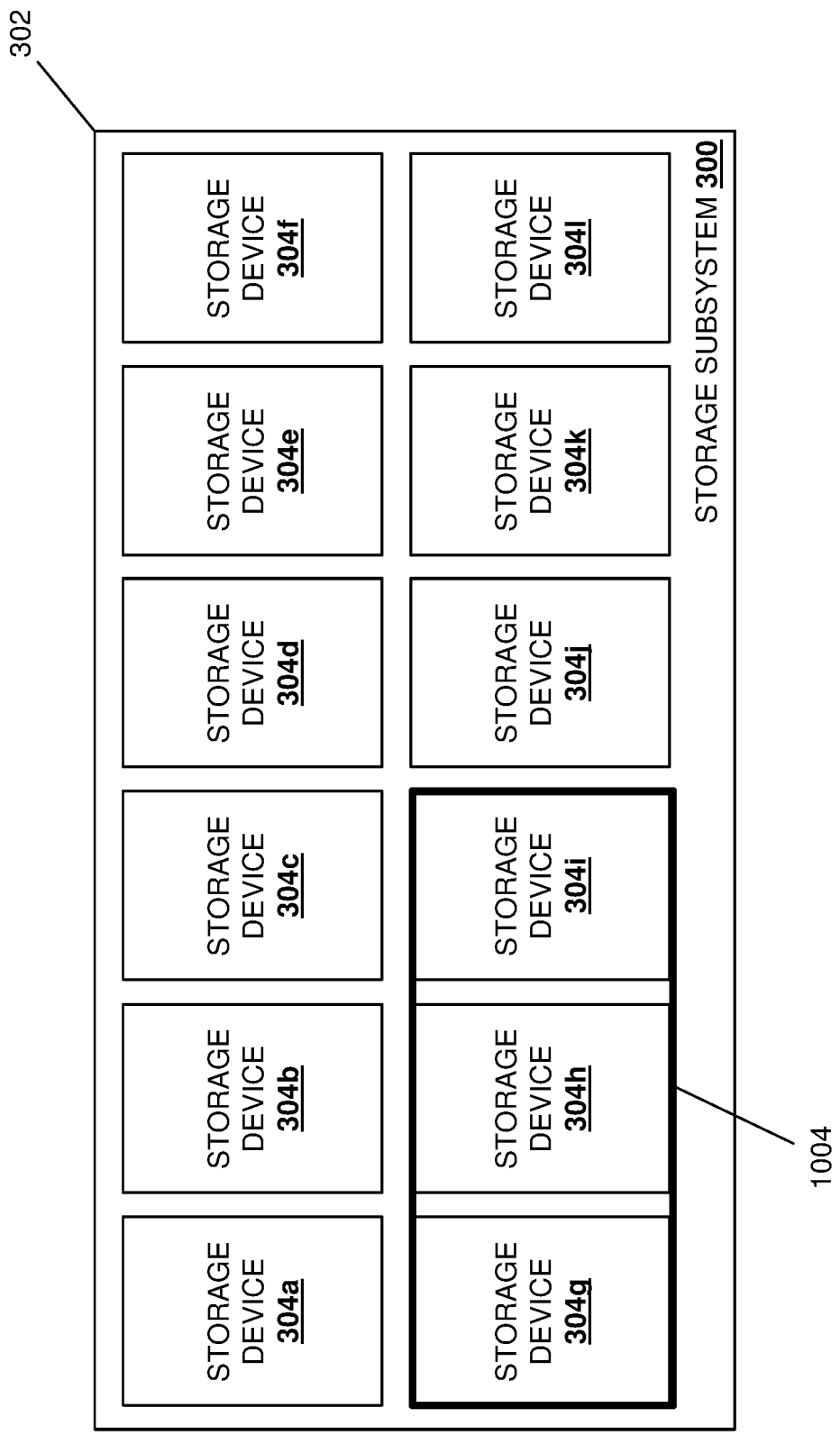
FIG. 10B is a schematic view illustrating an embodiment of the storage system of FIG. 3 operating during the method of FIG. 5.

Similarly, with reference to FIGS. 10A and 10B, the workload-solution-specific information retrieved at block 502 may identify a third workload solution 1000 that is provided compute resources 1002a in the server system 204b that is included in the second chassis 204, compute resources 1002b in the server system 206b that is included in the third chassis 206, and storage resources 1004 in the storage system 206d that is included in the third chassis 206. Continuing with the example above, compute resources 1002a and 1002b for the third workload solution 1000 may be provided by the server device included in the server system 204b, and the server device included in the server system 206b, while storage resources 1004 for the third workload solution 1000 may be provided by a second subset of storage devices in the storage device sled in the storage system 206d. For example, with reference to FIG. 10B, the storage devices 304g, 304h, and 304i in the storage subsystem 300 (i.e., a second subset of the storage devices 304a-304l) included in the storage system 206d may be utilized to provide storage resources 1004 for the third workload solution 1000. As will be appreciated by one of skill in the art in possession of the present disclosure, the server devices and storage devices utilized to provide the third workload solution 1000 may include any of a variety of components that utilize software (e.g., a firmware version) to operate. Furthermore, one of skill in the art in possession of the present disclosure will also recognize that the third workload solution 1000 may be provided for a third workload having a particular SLA, downtime requirements, cluster aware update processes, and/or other workload characteristics/properties known in the art, and those workload characteristics/properties may differ from the first workload and/or the second workload discussed above.

Figure 11:
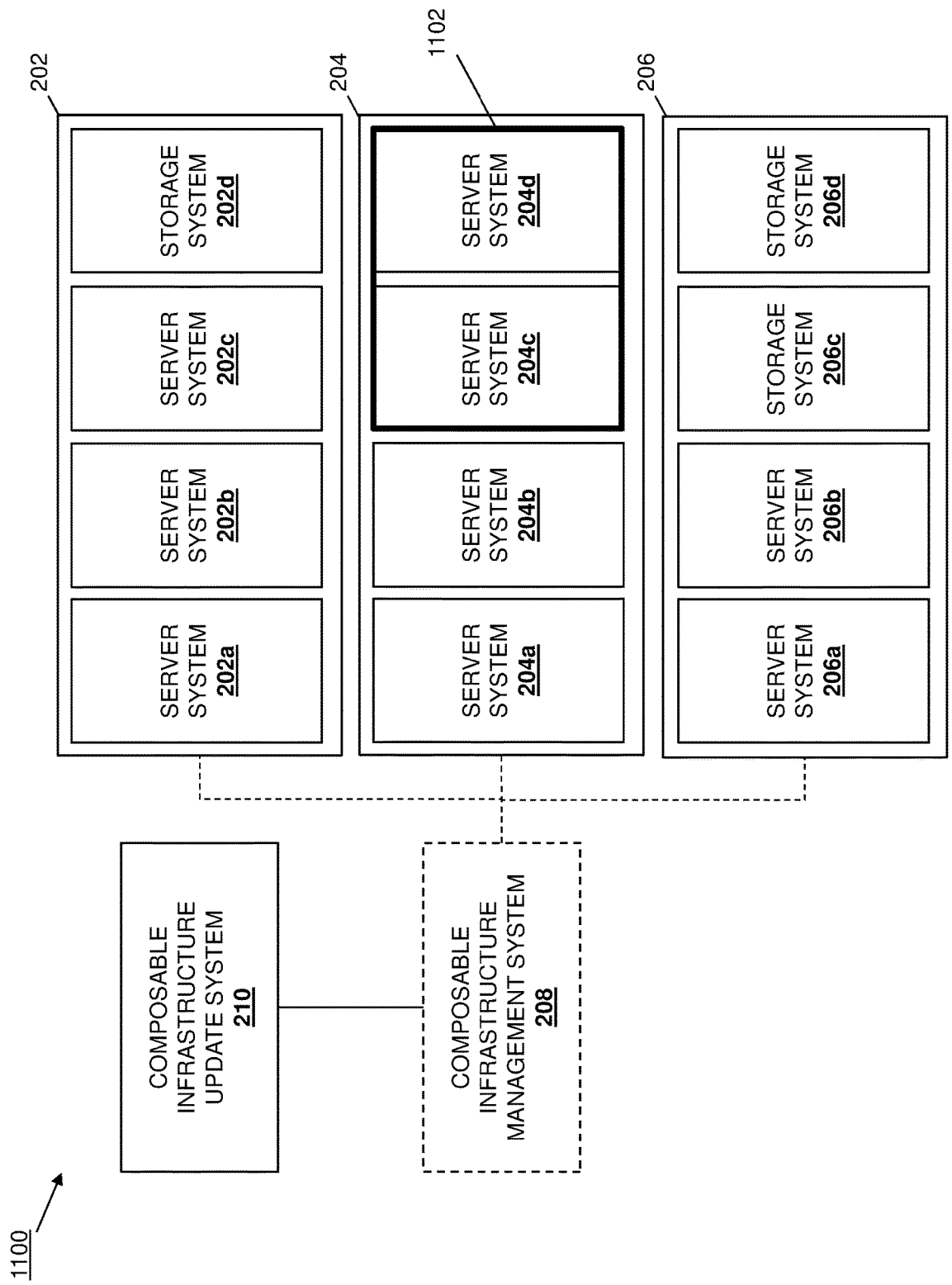
FIG. 11 is a schematic view illustrating an embodiment of the composable infrastructure update system of FIGS. 2A and 2B operating during the method of FIG. 5.

Similarly, with reference to FIG. 11, the workload-solution-specific information retrieved at block 502 may identify a fourth workload solution 1100 that is provided compute resources 1102 in the server system 204c and the server system 204d that are included in the second chassis 204. Continuing with the example above, compute resources 1102 for the fourth workload solution 1100 may be provided by the server device included in the server system 204c, and the server device included in the server system 204d. As will be appreciated by one of skill in the art in possession of the present disclosure, the server devices utilized to provide the fourth workload solution 1100 may include any of a variety of components that utilize software (e.g., a firmware version) to operate. Furthermore, one of skill in the art in possession of the present disclosure will also recognize that the fourth workload solution 1100 may be provided for a fourth workload having a particular SLA, downtime requirements, cluster aware update processes, and/or other workload characteristics/properties known in the art, and those workload characteristics/properties may differ from the first workload, the second workload, and/or the third workload discussed above. While four different workload solutions are illustrated and described as being identified at block 502, one of skill in the art in possession of the present disclosure will recognize that composable infrastructure systems may provide any number of workload solutions using any of a variety of components, and the identification of those workload solutions will fall within the scope of the present disclosure as well.

The method 500 then proceeds to block 504 where the composable infrastructure management system generates a workload solution catalog for each workload solution. In some embodiments, the composable infrastructure management engine 404 in the composable infrastructure management system 208 may include a workload solution catalog generator that is configured to utilize the workload-solution-specific information for each workload solution being provided by its composable infrastructure system, along with the inventory information in the composable infrastructure "master" catalog that is stored in the composable infrastructure management database 406, in order to generate workload solution catalog for each of the workloads provided by its composable infrastructure system that is specific to that workload solution and identifies the software utilized by the composable infrastructure components in the composable infrastructure system that are being used to provide that workload solution.

For example, with reference to the first workload solution 800 discussed above with reference to FIG. 8, the workload solution catalog for the first workload solution 800 may identify software utilized by the server system 202a (e.g., software utilized by any components in the server devices in the server system 202a and the server system 202b being used to provide the compute resources 802 for the first workload solution 800), software utilized by the storage system 202d (e.g., software utilized by any components in and/or associated with the storage devices in the first storage device sled in the storage system 202d (e.g., a storage expander card) being used to provide the storage resources 804*a* for the first workload solution 800), and software utilized by the storage system 206*c* (e.g., software utilized by any components in and/or associated with the storage devices in the first storage device sled in the storage system 206*c* (e.g., a storage expander card) being used to provide the storage resources 804*b* for the first workload solution 800).

Similarly, with reference to the second workload solution 900 discussed above with reference to FIGS. 9A and 9B, the workload solution catalog for the second workload solution 900 may identify software utilized by the server system 202*c* (e.g., software utilized by any components in the server device in the server system 202*c* being used to provide the compute resources 902 for the second workload solution 900), and software utilized by the storage devices 304*b* and 304*c* in the storage subsystem 300 of the storage system 206*d* (e.g., software utilized by components in and/or associated with the storage devices 304*b* and 304 in the storage device sled in the storage system 206*d* (e.g., a storage expander card) being used to provide the storage resources 904 for the second workload solution 900).

Similarly, with reference to the third workload solution 1000 discussed above with reference to FIGS. 10A and 10B, the workload solution catalog for the third workload solution 1000 may identify software utilized by the server system 204*b* (e.g., software utilized by components in the server device in the server system 204*b* being used to provide the compute resources 1002*a* for the third workload solution 1000), software utilized by the server system 206*b* (e.g., software utilized by components in the server device in the server system 206*b* being used to provide the compute resources 1002*b* for the third workload solution 1000), and software utilized by the storage devices 304*g*, 304*h*, and 304*i* in the storage subsystem 300 of the storage system 206*d* (e.g., software utilized by components in and/or associated with the storage devices 304*g*, 304*h*, and 304*i* in the storage device sled in the storage system 206*d* (e.g., a storage expander card) being used to provide the storage resources 1004 for the second workload solution 900).

Similarly, with reference to the fourth workload solution 1100 discussed above with reference to FIG. 11, the workload solution catalog for the fourth workload solution 1100 may identify software utilized by the server system 204*c* (e.g., software utilized by components in the server device in the server system 204*c* being used to provide the compute resources 1102 for the fourth workload solution 1100) and software utilized by the server system 204*d* (e.g., software utilized by components in the server device in the server system 204*d* being used to provide the compute resources 1102 for the fourth workload solution 1100).

Figure 7:
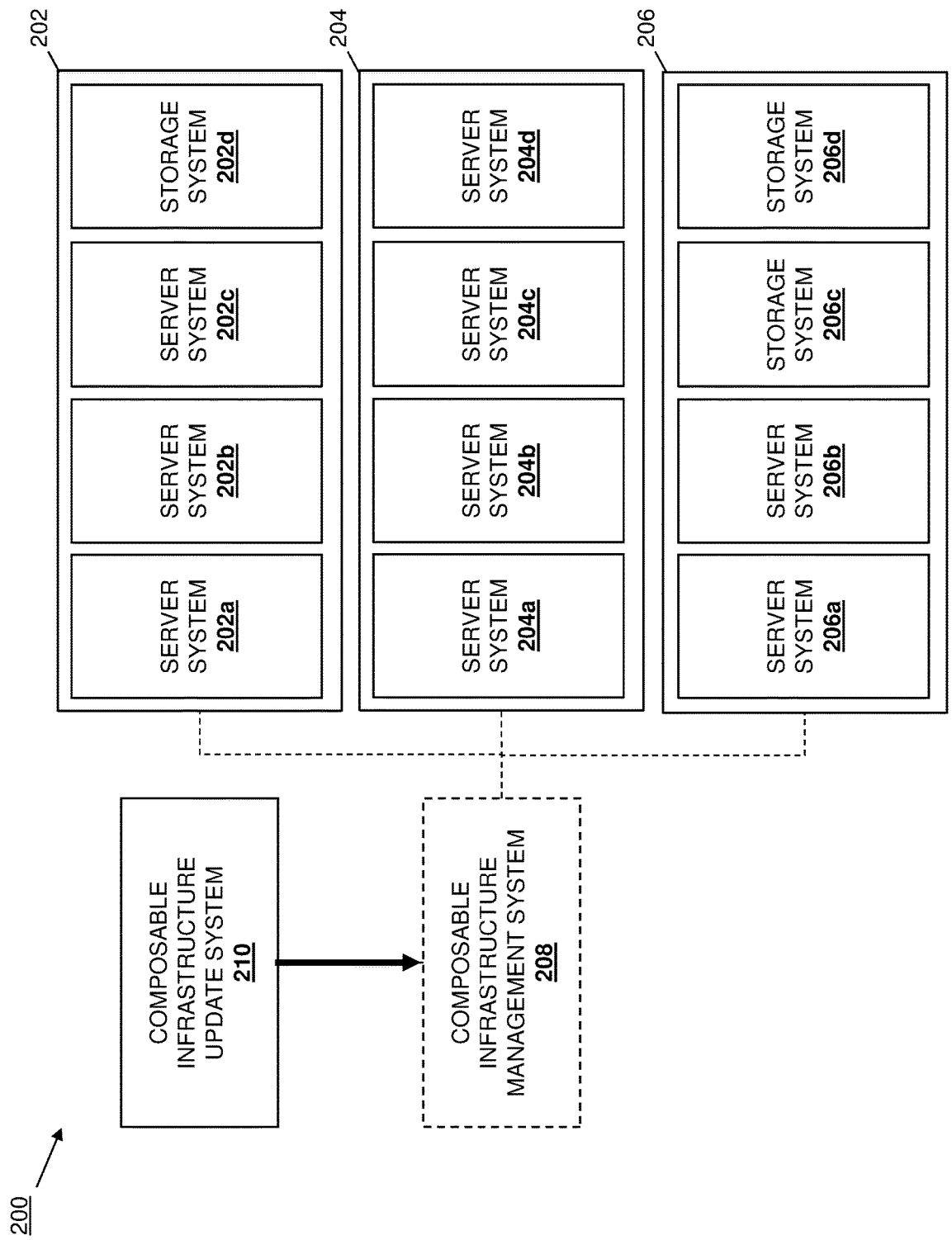
FIG. 7 is a schematic view illustrating an embodiment of the composable infrastructure update system of FIGS. 2A and 2B operating during the method of FIG. 5.

The method 500 then proceeds to block 506 where the composable infrastructure management system receives software updates for one or more composable infrastructure component. With reference to FIG. 7, in some embodiments, at block 502 the composable infrastructure management engine 404 in the composable infrastructure management system 208 may retrieve software updates from the composable infrastructure update system 210. For example, the composable infrastructure management engine 404 in the composable infrastructure management system 208 may include a composable infrastructure update portal that is configured to connect to the composable infrastructure update system 210 to access an online/network-based software repository that includes the latest software updates/software packages for the composable infrastructure components/composable infrastructure systems. As such, at block 502, the composable infrastructure update portal provided by the composable infrastructure management engine 404 in the composable infrastructure management system 208 may utilize the composable infrastructure "master" catalog that is stored in the composable infrastructure management database 406 to identify any software updates for the composable infrastructure system and its components provided in the first chassis 202, the second chassis 204, and the third chassis 306, retrieve those software updates, and store those software updates in a local software repository that may be included in the composable infrastructure management database 406.

The method 500 then proceeds to block 508 where the composable infrastructure management system determines that the one or more composable infrastructure components are being used to provide multiple workload solutions. In an embodiment, at block 508, the workload solution catalog generator provided by the composable infrastructure management engine 404 in the composable infrastructure system 400 may identify chassis that include composable infrastructure components that are being utilized to provide multiple different workload solutions, and may mark those composable infrastructure components as "dependent" composable infrastructure components. In some examples, dependent composable infrastructure components may be identified in a shared component catalog that includes any composable infrastructure component that is utilized to provide two or more workload solutions. Continuing with the examples above and with reference to the first workload solution 800 of FIG. 8, the second workload solution 900 of FIGS. 9A and 9B, the third workload solution 1000 of FIGS. 10A and 10B, and the fourth workload solution 1100 of FIG. 11, the first chassis 202 includes the server systems 202*a* and 202*b* that are being utilized to provide the compute resources 802 for the first workload solution 800, the server system 202*c* that is being utilized to provide the compute resources 902 for the second workload solution 900, and the storage system 202*d* that is being utilized to provide the storage resources 804*a* for the first workload solution 800.

Similarly, the second chassis 204 includes the server system 204*b* that is being utilized to provide the compute resources 1002*a* for the third workload solution 1000, and the server systems 204*c* and 204*d* that are being utilized to provide the compute resources 1102 for the fourth workload solution 1102. Similarly, the third chassis 206 includes the server system 206*b* that is being utilized to provide the compute resources 1002*b* for the third workload solution 1000, the storage system 206*c* that is being utilized to provide the storage resources 804*b* for the first workload solution 800, the storage devices 304*b* and 304*c* in the storage subsystem 300 of the storage system 206*d* that are being utilized to provide the storage resources 904 for the second workload solution 900, and the storage devices 304*g*, 304*h*, and 304*i* in the storage subsystem 300 of the storage system 206*d* that are being utilized to provide the storage resources 1004 for the third workload solution 1000.

As such, in the illustrated embodiment, each of the composable infrastructure components in the first chassis 202, the second chassis 204, and the third chassis 206 may be identified as dependent composable infrastructure components based on the need by the composable infrastructure management system 208 to update entire chassis and each of the first chassis 202, the second chassis 204, and the third chassis 206 including at least two composable infrastructure components that provide different workload solutions. However, one of skill in the art in possession of the present disclosure will recognize how the teachings of the present disclosure may be utilized with different update requirements (e.g., when updates may be applied to subsets of composable infrastructure components in a chassis) while remaining within the scope of the present disclosure as well. For example, in situations where software updates can be applied on a composable infrastructure component basis such as when a particular server device or storage device sled may be updated independently, in the examples above the first storage device sled in the storage system 206*d* provided in the third chassis 206 may be identified as a dependent composable infrastructure component due to it including subsets of storage devices providing different workload solutions.

The method 500 then proceeds to block 510 where the composable infrastructure management system schedules the software update for the at least one composable infrastructure component in consideration of the multiple workloads. In some embodiments, the composable infrastructure management engine 404 in the composable infrastructure management system 400 may include a compliance check and update engine that is configured to utilize the workload solution catalogs and the software updates in the local software repository to determine how to perform software update(s) on its composable infrastructure components in its composable infrastructure system. As such, at block 510, the compliance check and update engine provided by the composable infrastructure management engine 404 in the composable infrastructure management system 208/400 may use the workload solution catalogs to identify the current software being utilize by the composable infrastructure components in its composable infrastructure system to provide each workload solution, and compare that current software to the software updates that are available in its local software repository to identify composable infrastructure components in its composable infrastructure system that require software updates. In some embodiments, the compliance check and update engine provided by the composable infrastructure management engine 404 in the composable infrastructure management system 208/400 may operate to display any composable infrastructure components in its composable infrastructure system that require software updates to a user or administrator of the composable infrastructure system, as well as provide the ability to initiate the update of those composable infrastructure components (e.g., via the composable infrastructure update portal discussed above.)

In the event the compliance check and update engine provided by the composable infrastructure management engine 404 in the composable infrastructure management system 208/400 identifies a dependent composable infrastructure component that requires a software update (e.g., a first composable infrastructure component that provides resources for a first workload solution and that is included in a chassis that includes a second composable infrastructure component that provides resources for a second workload solution; a first subset of storage device(s) that provide storage resources for a first workload solution and that are included in a storage device sled that includes a second subset of storage device(s) that provide storage resources for a second workload solution; etc.), the compliance check and update engine may operate to perform a variety of operations to schedule the software update for that dependent composable infrastructure component in consideration of the multiple workload solutions that will be effected by that software update. In some embodiments, the operations to schedule the software update for a dependent composable infrastructure component in consideration of the multiple workload solutions that will be effected by that software update may be performed automatically (e.g., without contemporaneous instruction by a user or administrator of the converged infrastructure system), or may be perfomed in response to an instruction by a user or global administrator of the converged infrastructure system (e.g., provided via the composable infrastructure update portal discussed above by a global administrator that administers the composable infrastructure system for local adminstrators who administer respective workloads.)

For example, in some embodiments the compliance check and update engine provided by the composable infrastructure management engine 404 in the composable infrastructure management system 208/400 may identify a dependent composable infrastructure component that requires a software update, and may schedule the software update for that dependent composable infrastructure component in consideration of the multiple workload solutions that will be effected by that software update by identifying a time during which each of the multiple workload solutions are known to be in relatively low use (e.g., by reviewing usage statistics for each of the workload solutions that will be effected (i.e., each of the workload solutions provided by the composable infrastructure components in the same chassis that includes the dependent composable infrastructure component that requires the software update.))

In another example, in some embodiments the compliance check and update engine provided by the composable infrastructure management engine 404 in the composable infrastructure management system 208/400 may identify a dependent composable infrastructure component that requires a software update, and may notify users or other administrators (e.g., the global and/or local administrators discussed above) of each of the multiple workload solutions that will be effected by that software update in order to schedule a workload solution downtime for updating the dependent composable infrastructure components that requires the software update. In either example, in some embodiments, the compliance check and update engine provided by the composable infrastructure management engine 404 in the composable infrastructure management system 208/400 may determine that downtimes are not an option for any particular workload solution (e.g., based on SLAs or downtime requirements), and may operate to migrate that workload solution such that it is provided by composable infrastructure components in a different chassis than the chassis that includes the composable infrastructure component that requires the software update. However, while several examples have been provided, one of skill in the art in possession of the present disclosure will recognize that a variety of operations may be performed to schedule software updates for a dependent composable infrastructure component in consideration of multiple workload solutions that will be affected by that software update.

Continuing with the examples provided above, the first chassis 202 includes the server systems 202*a* and 220*b* that provide the compute resources 802 for the first workload solution 800, the server system 202*c* that provides the compute resources 902 for the second workload solution 900, and the storage system 202*d* that provides the storage resources 804*a* for the first workload solution 800. As such, at block 510, the compliance check and update engine provided by the composable infrastructure management engine 404 in the composable infrastructure management system 208/400 may determine that any of the server systems 202*a*, 202*b*, and 202*c* and/or the storage system 202*d* require a software update, and may perform any of the operations discussed above to provide that software update in consideration of the first workload solution 800 and the second workload solution 900.

Similarly, continuing with the examples provided above, the second chassis 204 includes the server system 204b that provides the compute resources 1002a for the third workload solution 1000, and the server systems 204c and 204d that provide the compute resources 1102 for the fourth workload solution 1102. As such, at block 510, the compliance check and update engine provided by the composable infrastructure management engine 404 in the composable infrastructure management system 208/400 may determine that any of the server systems 204b, 204c, and 204d require a software update, and may perform any of the operations discussed above to provide that software update in consideration of the third workload solution 1000 and the fourth workload solution 1102.

Similarly, continuing with the examples provided above, the third chassis 206 includes the server system 206b that provides the compute resources 1002b for the third workload solution 1000, the storage system 206c that provides the storage resources 804b for the first workload solution 800, the storage devices 304b and 304c in the storage subsystem 300 of the storage system 206d that provide the storage resources 904 for the second workload solution 900, and the storage devices 304g, 304h, and 304i in the storage subsystem 300 of the storage system 206d that provide the storage resources 1004 for the third workload solution 1000. As such, at block 510, the compliance check and update engine provided by the composable infrastructure management engine 404 in the composable infrastructure management system 208/400 may determine that any of the server systems 206b, the storage system 206c, and the storage devices 304b, 304c, 304g, 304h, and 304i require a software update, and may perform any of the operations discussed above to provide that software update in consideration of the second workload solution 900 and the third workload solution 1000. In particular, at block 510, the compliance check and update engine provided by the composable infrastructure management engine 404 in the composable infrastructure management system 208/400 may determine that the storage devices 304b, 304c, 304g, 304h, and 304i and/or their associated components (e.g., a storage expander card) require a software update, and may perform any of the operations discussed above to provide that software update in consideration of the second workload solution 900 and the third workload solution 1000.

Thus, systems and methods have been described that provide for independent treatment of discrete workload solutions when performing updates for composable infrastructure systems that provide those workload solutions, and thus in consideration of the SLAs, downtime requirements, cluster aware update processes, and/or other characteristics/properties of those workload solutions. For example, a composable infrastructure management system may maintain a master inventory list of all of the server devices and storage devices in the composable infrastructure system, and use that master inventory list to retrieve the latest applicable software updates for those server devices and storage devices and store those software updates in a local software repository. The composable infrastructure management system may then utilize a composable infrastructure/workload solution data store to create a custom workload solution catalog for each workload solution being provided by the composable infrastructure system, which may identify all of the server devices and/or storage devices (and/or any of their associated hardware) that are being utilized to provide any particular workload solution, along with the latest software (e.g., a latest firmware version) utilized by those server devices and storage devices. The workload solution catalogs may then be used with the local software repository to provide for the updating of software for any particular server device and/or storage device (and/or any of their associated hardware) in a manner that considers the multiple workload solutions it may be currently providing (i.e., on a per-workload solution and per-composable-infrastructure-component basis), thus providing composable infrastructure system updates in consideration of the SLAs, downtime requirements, cluster aware update processes, and/or other characteristics/properties of the workload solutions it provides Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A composable infrastructure update system, comprising:
   a composable infrastructure system including a plurality of composable infrastructure components; and
   a composable infrastructure management system that is coupled to the plurality of composable infrastructure components in the composable infrastructure system, wherein the composable infrastructure management system is configured to:
   identify a plurality of workload solutions that are being provided by at least one of the plurality of composable infrastructure components in the composable infrastructure system;
   generate, for each of the plurality of workload solutions, a respective workload solution catalog that identifies the at least one of the plurality of composable infrastructure components in the composable infrastructure system that are providing that workload solution;
   receive a first software update for a first composable infrastructure component that is included in the plurality of composable infrastructure components;
   determine, based on the respective workload solution catalogs, that the first composable infrastructure component is being used to provide at least two of the plurality of workload solutions that will be affected by the first software update;
   schedule the performance of the first software update for the first composable component in consideration of the at least two of the plurality of workload solutions; and
   update, based on the scheduling of the performance of the first software update, the first composable component with the first software update in consideration of the at least two of the plurality of workload solutions.

2. The system of claim 1, wherein the plurality of composable infrastructure components include at least one server system and at least one storage system.

3. The system of claim 2, wherein the first composable infrastructure component is provided by a first storage system, and wherein a first workload solution included in the at least two of the plurality of workload solutions is provided by a first subset of a plurality of storage devices that are included in the first storage system, and wherein a second workload solution included in the at least two of the plurality of workload solutions is provided by a second subset of the plurality of storage devices that are included in the first storage system.

4. The system of claim 1, wherein each respective workload solution catalog for each respective workload solution identifies the current software being utilized by the at least one of the plurality of composable infrastructure components that are providing that respective workload solution.

5. The system of claim 4, wherein the composable infrastructure management system is configured to:
  determine that the current software being utilized by the first composable infrastructure component, which is providing a first workload solution that is included at least two of the plurality of workload solutions, should be updated with the first software update.

6. The system of claim 1, wherein the composable infrastructure management system is configured to:
  receive respective software updates for each of the plurality of composable infrastructure components, wherein the first software update for the first composable infrastructure component is included in the respective software updates for each of the plurality of composable infrastructure components.

7. An Information Handling System (IHS), comprising:
  a processing system; and
  a memory system that is coupled to the processing system and that includes instructions that, when executed by the processing system, cause the processing system to provide a composable infrastructure management engine that is configured to:
    identify a plurality of workload solutions that are being provided by at least one of a plurality of composable infrastructure components included in a composable infrastructure system;
    generate, for each of the plurality of workload solutions, a respective workload solution catalog that identifies the at least one of the plurality of composable infrastructure components in the composable infrastructure system that are providing that workload solution;
    receive a first software update for a first composable infrastructure component that is included in the plurality of composable infrastructure components;
    determine, based on the respective workload solution catalogs, that the first composable infrastructure component is being used to provide at least two of the plurality of workload solutions that will be affected by the first software update;
    schedule the performance of the first software update for the first composable component in consideration of the at least two of the plurality of workload solutions; and
    update, based on the scheduling of the performance of the first software update, the first composable component with the first software update in consideration of the at least two of the plurality of workload solutions.

8. The IHS of claim 7, wherein the plurality of composable infrastructure components include at least one server system and at least one storage system.

9. The IHS of claim 8, wherein the first composable infrastructure component is provided by a first storage system, and wherein a first workload solution included in the at least two of the plurality of workload solutions is provided by a first subset of a plurality of storage devices that are included in the first storage system, and wherein a second workload solution included in the at least two of the plurality of workload solutions is provided by a second subset of the plurality of storage devices that are included in the first storage system.

10. The IHS of claim 7, wherein each respective workload solution catalog for each respective workload solution identifies the current software being utilized by the at least one of the plurality of composable infrastructure components that are providing that respective workload solution.

11. The IHS of claim 10, wherein the composable infrastructure management engine is configured to:
  determine that the current software being utilized by the first composable infrastructure component, which is providing a first workload solution that is included at least two of the plurality of workload solutions, should be updated with the first software update.

12. The IHS of claim 7, wherein the composable infrastructure management engine is configured to:
  receive respective software updates for each of the plurality of composable infrastructure components, wherein the first software update for the first composable infrastructure component is included in the respective software updates for each of the plurality of composable infrastructure components.

13. The IHS of claim 7, wherein the scheduling the performance of the first software update for the first composable component in consideration of the at least two of the plurality of workload solutions includes:
  scheduling a downtime for the at least two of the plurality of workload solutions.

14. A method for updating a composable infrastructure, comprising:
  identifying, by a composable infrastructure management system, a plurality of workload solutions that are being provided by at least one of a plurality of composable infrastructure components included in a composable infrastructure system;
  generating, by the composable infrastructure management system for each of the plurality of workload solutions, a respective workload solution catalog that identifies the at least one of the plurality of composable infrastructure components in the composable infrastructure system that are providing that workload solution;
  receiving, by the composable infrastructure management system, a first software update for a first composable infrastructure component that is included in the plurality of composable infrastructure components;
  determining, based on the respective workload solution catalogs, by the composable infrastructure management system, that the first composable infrastructure component is being used to provide at least two of the plurality of workload solutions that will be affected by the first software update;
  scheduling, by the composable infrastructure management system, the performance of the first software update for the first composable component in consideration of the at least two of the plurality of workload solutions; and
  updating, by the composable infrastructure management system and based on the scheduling of the performance of the first software update, the first composable component with the first software update in consideration of the at least two of the plurality of workload solutions.

15. The method of claim 14, wherein the plurality of composable infrastructure components include at least one server system and at least one storage system.

16. The method of claim 15, wherein the first composable infrastructure component is provided by a first storage system, and wherein a first workload solution included in the at least two of the plurality of workload solutions is provided by a first subset of a plurality of storage devices that are included in the first storage system, and wherein a second workload solution included in the at least two of the plurality of workload solutions is provided by a second subset of the plurality of storage devices that are included in the first storage system.

17. The method of claim 14, wherein each respective workload solution catalog for each respective workload solution identifies the current software being utilized by the at least one of the plurality of composable infrastructure components that are providing that respective workload solution.

18. The method of claim 14, further comprising:
determining, by the composable infrastructure management system, that the current software being utilized by the first composable infrastructure component, which is providing a first workload solution that is included at least two of the plurality of workload solutions, should be updated with the first software update.

19. The method of claim 14, further comprising:
receiving, by the composable infrastructure management system, respective software updates for each of the plurality of composable infrastructure components, wherein the first software update for the first composable infrastructure component is included in the respective software updates for each of the plurality of composable infrastructure components.

20. The method of claim 14, wherein the scheduling the performance of the first software update for the first composable component in consideration of the at least two of the plurality of workload solutions includes:
scheduling, by the composable infrastructure management system, a downtime for the at least two of the plurality of workload solutions.

* * * * *